US012650529B2

(12) United States Patent
Chiang et al.

(10) Patent No.: US 12,650,529 B2
(45) Date of Patent: Jun. 9, 2026

(54) METHOD OF DETERMINING EARTHQUAKE BY TIME SERIES INTERSECTION OF A PLURALITY OF SEISMOGRAPHS

(71) Applicant: P-Waver Inc., Taipei (TW)

(72) Inventors: Hung-Wei Chiang, Taipei (TW);
Hsiu-Hsien Wang, Taipei (TW);
Pei-Yang Lin, Taipei (TW)

(73) Assignee: P-WAVER INC., Taipei (TW)

( * ) Notice: Subject to any disclaimer, the term of this patent is extended or adjusted under 35 U.S.C. 154(b) by 702 days.

(21) Appl. No.: 18/156,760

(22) Filed: Jan. 19, 2023

(65) Prior Publication Data

US 2024/0248223 A1      Jul. 25, 2024

(51) Int. Cl.
*G01V 1/01* (2024.01)
(52) U.S. Cl.
CPC ..................................... *G01V 1/01* (2024.01)
(58) Field of Classification Search
CPC ....................................................... G01V 1/01
See application file for complete search history.

(56) References Cited

U.S. PATENT DOCUMENTS

| | | | | |
|---|---|---|---|---|
| 11,194,066 B2* | 12/2021 | Mondragon | ............. | G06N 3/08 |
| 2021/0356612 A1* | 11/2021 | Kendall | .................... | G01V 1/01 |
| 2024/0142646 A1* | 5/2024 | Lindsey | ................. | G01V 1/226 |

FOREIGN PATENT DOCUMENTS

TW            I553327            11/2015

* cited by examiner

*Primary Examiner* — Elias Desta
(74) *Attorney, Agent, or Firm* — Timothy H. Van Dyke; Wolter Van Dyke Davis, PLLC

(57) ABSTRACT

An earthquake detection method is disclosed. The method comprises the following steps: receiving a first signal and at least a second signal, wherein the first signal is triggered in response to a first vibration state of a main detection site, and the at least a second signal is triggered in response to at least a second vibration state of at least a backup detection site; determining whether a quantity of those being enabled among the at least a second signal satisfies a quantity ratio condition, and determining whether the first signal and the quantity of the at least a second signal are both enabled at a specific time point, wherein the first and the quantity of the at least a second signals respectively have a first and at least a second initial enabled time points; and determining there is a real earthquake event when an interval between the first and the at least a second signal satisfies a time relationship.

5 Claims, 9 Drawing Sheets

S10

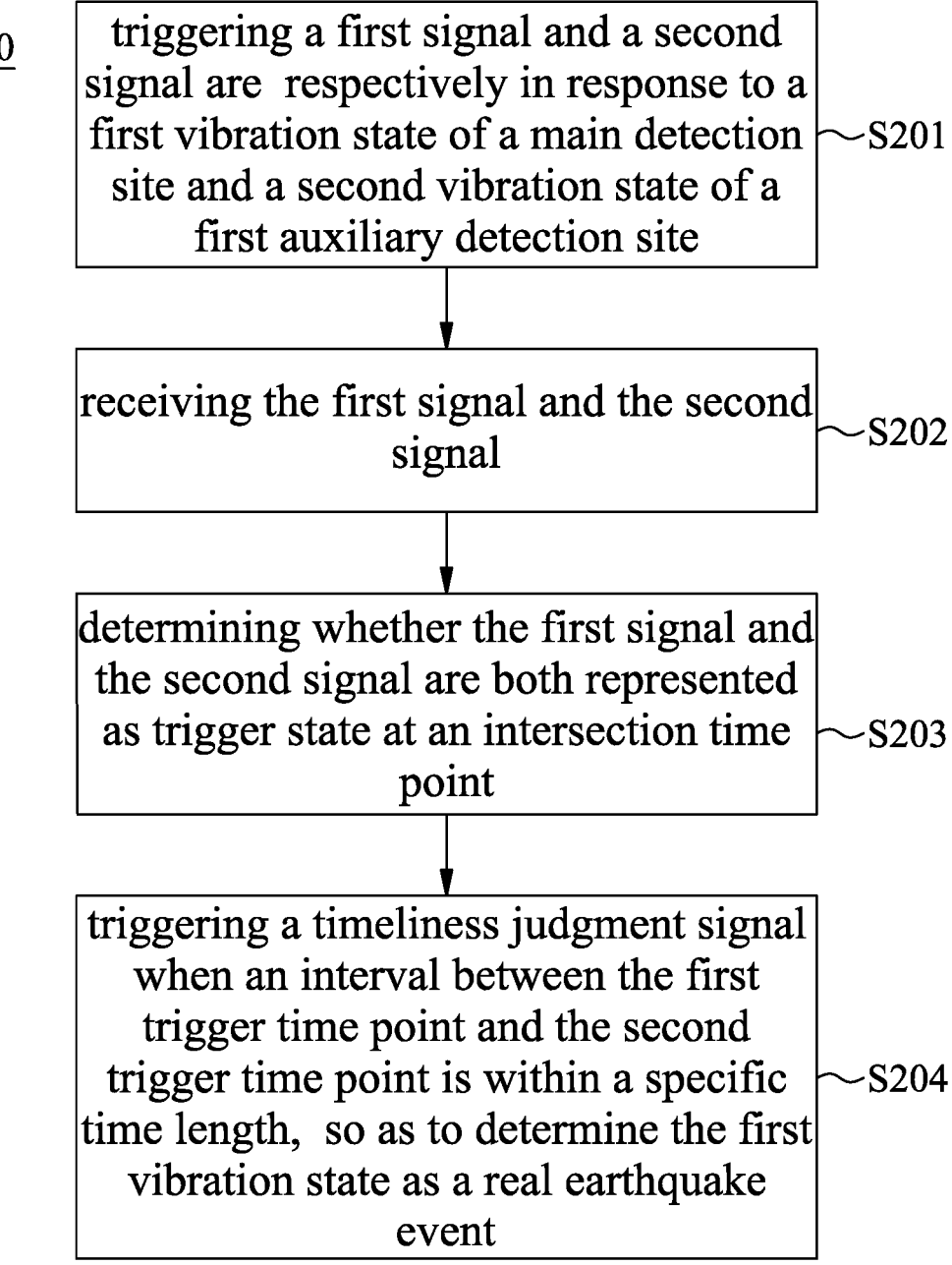

S20 triggering a first signal and a second signal are respectively in response to a first vibration state of a main detection site and a second vibration state of a first auxiliary detection site ~S201 receiving the first signal and the second signal ~S202 determining whether the first signal and the second signal are both represented as trigger state at an intersection time point ~S203 triggering a timeliness judgment signal when an interval between the first trigger time point and the second trigger time point is within a specific time length, so as to determine the first vibration state as a real earthquake event ~S204

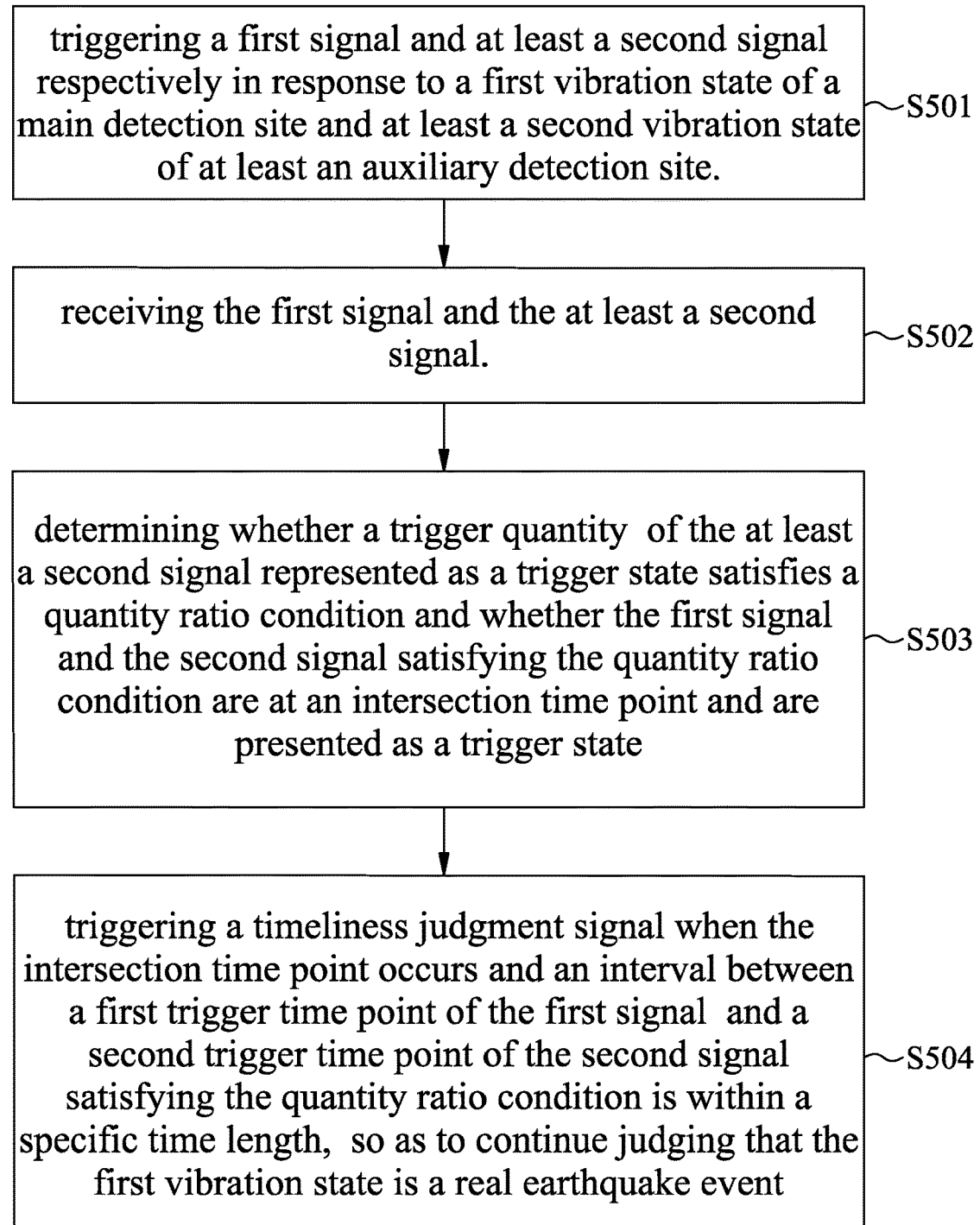

triggering a first signal and at least a second signal respectively in response to a first vibration state of a main detection site and at least a second vibration state of at least an auxiliary detection site.  ~S501 receiving the first signal and the at least a second signal.  ~S502 determining whether a trigger quantity of the at least a second signal represented as a trigger state satisfies a quantity ratio condition and whether the first signal and the second signal satisfying the quantity ratio condition are at an intersection time point and are presented as a trigger state  ~S503 triggering a timeliness judgment signal when the intersection time point occurs and an interval between a first trigger time point of the first signal and a second trigger time point of the second signal satisfying the quantity ratio condition is within a specific time length, so as to continue judging that the first vibration state is a real earthquake event  ~S504

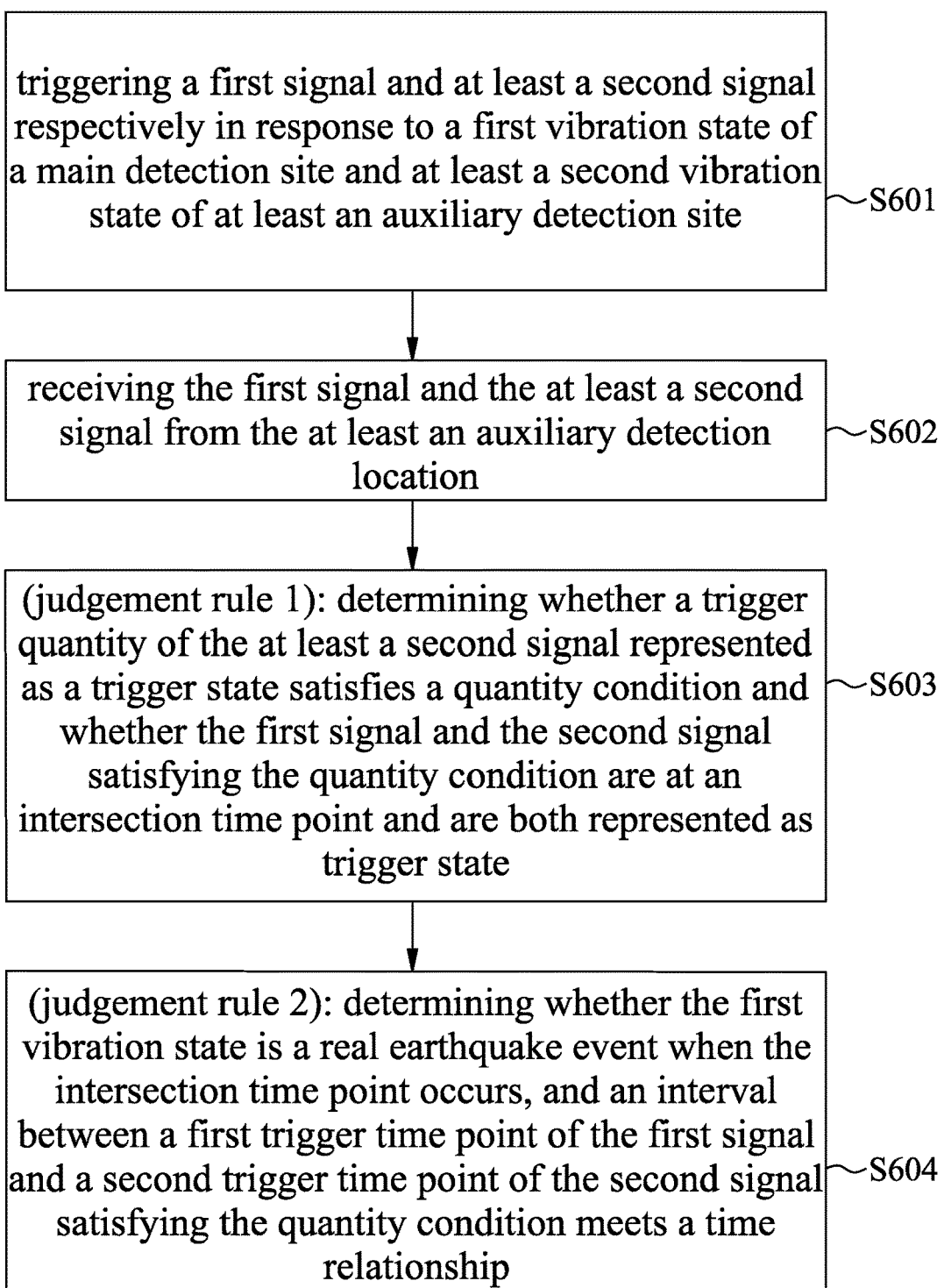

triggering a first signal and at least a second signal respectively in response to a first vibration state of a main detection site and at least a second vibration state of at least an auxiliary detection site ~S601 receiving the first signal and the at least a second signal from the at least an auxiliary detection location ~S602

(judgement rule 1): determining whether a trigger quantity of the at least a second signal represented as a trigger state satisfies a quantity condition and whether the first signal and the second signal satisfying the quantity condition are at an intersection time point and are both represented as trigger state ~S603

(judgement rule 2): determining whether the first vibration state is a real earthquake event when the intersection time point occurs, and an interval between a first trigger time point of the first signal and a second trigger time point of the second signal satisfying the quantity condition meets a time relationship ~S604

Fig. 14

METHOD OF DETERMINING EARTHQUAKE BY TIME SERIES INTERSECTION OF A PLURALITY OF SEISMOGRAPHS

FIELD OF THE INVENTION

The present invention relates to a fast and efficient earthquake detection method, and more particularly, to a fast and efficient earthquake detection method with multiple detection locations.

BACKGROUND OF THE INVENTION

Since the wave speed of the longitudinal wave is about 6-8 kilometers per second on the surface, and the wave speed of the shear wave is about half that of the longitudinal wave on the surface, it can be clearly observed that there is a considerable gap between the longitudinal wave and the transverse wave at the time of arrival at a certain distance from the epicenter. For example, at a distance of about 10 kilometers from the epicenter, the time interval between the arrival of longitudinal waves and shear waves is 3 seconds. If there is a device that can effectively determine whether it is a real earthquake event according to the measurement data of longitudinal waves within this time, it will be possible for safety measures to be taken in time. Also, the ability to eliminate the situation of non-earthquake events would be possible.

However, seismic detectors installed in different areas may face different detection environments. For example, seismic detectors installed near factories are likely to detect vibrations caused by the operation of machines in the factory. Seismic detectors installed near homes or office buildings are more likely to be affected by the movement of people, or to detect vibrations when doors are opened or knocked. For another example, when a foundation needs to be laid for building construction, the nearby earthquake detectors are likely to detect larger vibrations which may be judged as earthquakes. Another example is that train track vibrations are not a real earthquake. To avoid these disturbances, the location of the sensor needs to be positioned at a distance. Since these vibrations are not vibrations caused by real earthquakes, earthquake detectors must exclude vibrations caused by these human factors to increase the reliability of an earthquake early warning system.

In particular, consideration of the different needs of an early warning system in different application fields needs to be taken into account. For example, a false alarm for general school offices, general residences, and company offices will not cause serious economic losses. However, for technology companies that mass-produce products through automated production lines (e.g., wafer fabs), production line stoppages due to false alarms may result in significant and unnecessary economic losses. Therefore, improving the accuracy of an earthquake early warning system is particularly important for technology companies.

The Republic of China Patent Publication No. 1553327 provides an earthquake detection system, which includes a seismic data receiving module, a threshold value setting module and an earthquake detection device, which is used to determine whether a new seismic data is an earthquake event according to a plurality of seismic data and earthquake threshold values when the new seismic data is received, so as to generate a judgment result.

Although the threshold value setting module in the above-mentioned patent can use the ratio of the short-term average value and the long-term average value to adjust the seismic threshold value to automatically adjust the seismic threshold value, this method is only applicable to the same detection location having a fixed vibration pattern. For example, the movement of people at work during the day causes the seismograph to frequently detect larger vibrations, while at night, the seismograph detects smaller and less frequent vibrations. The earthquake threshold can be automatically increased during the day, and the earthquake threshold can be automatically lowered at night. However, this method can only reduce the misjudgment caused by noise, and there are still steps for improvement in whether it can be quickly or accurately determined as a real earthquake event.

SUMMARY OF THE INVENTION

In view of the deficiencies of the prior art, it is expected to provide a reliable detection system, detection method, and detection device for judging seismic events, which can provide the required alarms for different targets.

The present invention improves the reliability of earthquake early warning by deploying earthquake detection devices at different earthquake detection locations, and uses the number of triggers of the earthquake detection devices to determine whether an earthquake occurs, which can solve the problem of early warning issues with unreliable or false alarms.

The present invention also uses the longitudinal waves detected by the earthquake detection devices at different earthquake detection locations to trigger the monitor signal, and further judges whether the earthquake occurs. This method having high accuracy and reliability can be applied for a rapid detection, and can be applied to general school institutions, general residences, corporate offices, etc. Considering economic factors, earthquake detection systems and earthquake detection devices using this method are simple, fast, and effective, and it also saves deployment costs.

In accordance with one aspect of the present invention, an earthquake detection method for judging earthquakes by a time sequence intersection of plural seismographs is disclosed. The method comprises the following steps: receiving a first signal triggered in response to a first vibration state of a main detection site and a second signal triggered in response to a second vibration state of a backup detection site; determining whether the first signal and the second signal are both enabled at a specific time point, wherein the first and second signals respectively have first and second initial enabled time points; and determining there is a real earthquake event when an interval between the first and second initial enabled time points is within a specific time length.

In accordance with another aspect of the present invention, an earthquake detection method is disclosed. The method comprises the following steps: receiving a first signal and at least a second signal, wherein the first signal is triggered in response to a first vibration state of a main detection site, and the at least a second signal is triggered in response to at least a second vibration state of at least a backup detection site; determining whether a quantity of those being enabled among the at least a second signal satisfies a quantity ratio condition, and determining whether the first signal and the quantity of the at least a second signal are both enabled at a specific time point, wherein the first and the quantity of the at least a second signals respectively have a first and at least a second initial enabled time points;

and determining there is a real earthquake event when an interval between the first and the at least a second signals is within a specific time length.

In accordance with a further aspect of the present invention, an earthquake detection method is disclosed. The method comprises the following steps: receiving a first signal and at least a second signal, wherein the first signal is triggered in response to a first vibration state of a main detection site, and the at least a second signal is triggered in response to at least a second vibration state of at least a backup detection site; determining whether a quantity of those being enabled among the at least a second signal satisfies a quantity ratio condition, and determining whether the first signal and the quantity of the at least a second signal are both enabled at a specific time point, wherein the first and the quantity of the at least a second signals respectively have a first and at least a second initial enabled time points; and determining there is a real earthquake event when an interval between the first and the at least a second signal satisfies a time relationship.

The above objectives and advantages of the present invention will become more readily apparent to those ordinarily skilled in the art after reviewing the following detailed descriptions and accompanying drawings, in which:

BRIEF DESCRIPTION OF THE DRAWINGS

FIG. 3 is a schematic diagram showing an earthquake detection method for judging an earthquake by the time sequence intersection of multiple seismographs according to a preferred embodiment of the present invention;

FIG. 13 is a schematic diagram of the earthquake detection method according to another preferred embodiment of the present invention; and FIG. 14 is a schematic diagram of the earthquake detection method according to another preferred embodiment of the present invention.

DETAILED DESCRIPTION OF THE PREFERRED EMBODIMENTS

Please read the following detailed description with reference to the accompanying drawings of the present disclosure. The accompanying drawings of the present disclosure are used as examples to introduce various embodiments of the present disclosure and to understand how to implement the present disclosure. The embodiments of the present disclosure provide sufficient content for those skilled in the art to implement the embodiments of the present disclosure, or implement embodiments derived from the content of the present disclosure. It should be noted that these embodiments are not mutually exclusive with each other, and some embodiments can be appropriately combined with another one or more embodiments to form new embodiments, that is, the implementation of the present disclosure is not limited to the examples disclosed below. In addition, for the sake of brevity and clarity, relevant details are not excessively disclosed in each embodiment, and even if specific details are disclosed, only examples are used to make readers understand. The present invention will now be described more specifically with reference to the following embodiments. It is to be noted that the following descriptions of the preferred embodiments of this invention are presented herein for the purposes of illustration and description only; they are not intended to be exhaustive or to be limited to the precise form disclosed.

Figures 1A, 1B:
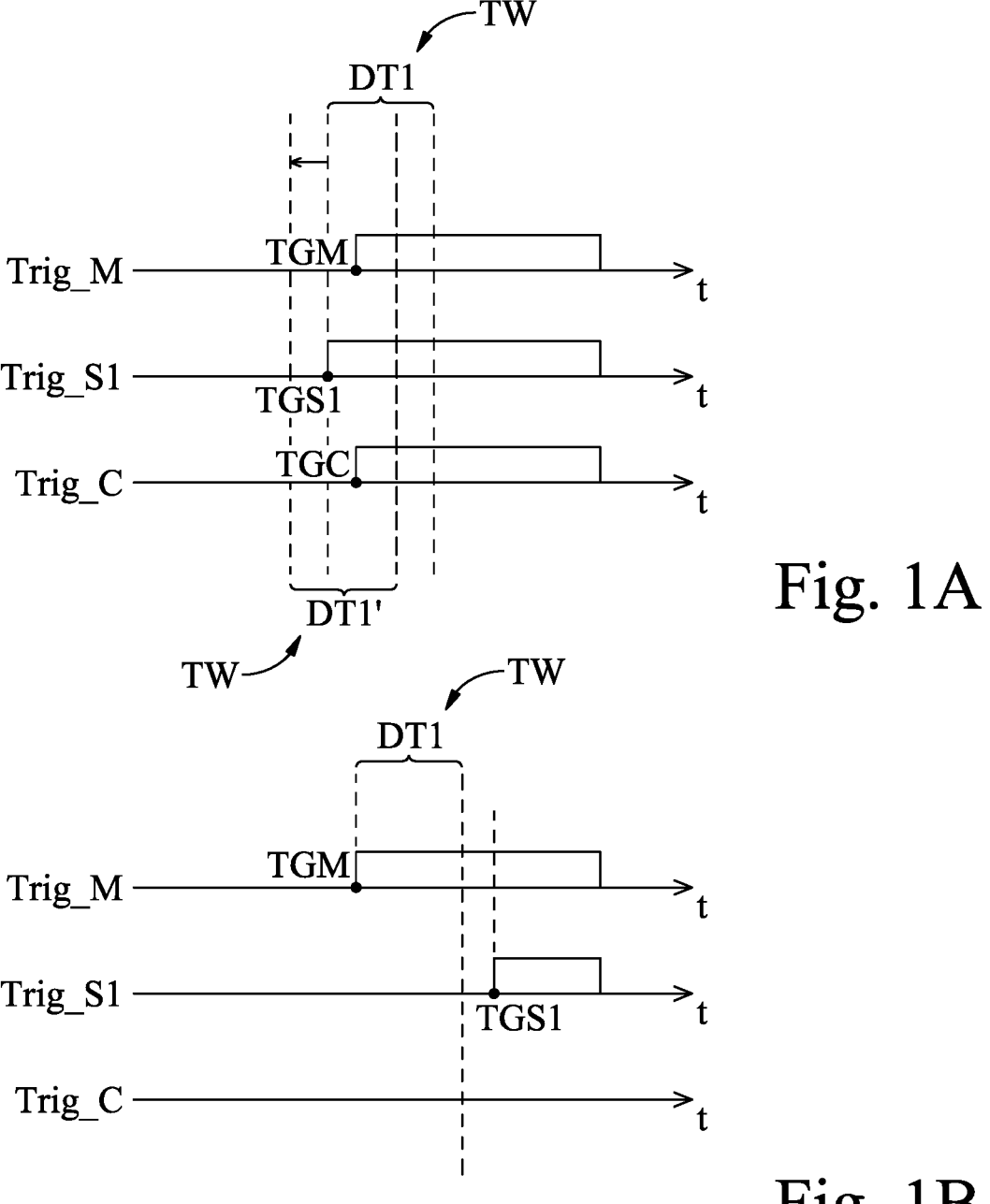
FIG. 1A is a schematic diagram showing a timeliness judgment signal is triggered according to a preferred embodiment of the present disclosure.
FIG. 1B is a schematic diagram showing a timeliness judgment signal is not triggered according to a preferred embodiment of the present disclosure.

Please refer to FIGS. 1A and 1B, which are schematic diagrams of monitor signals associated with an earthquake according to a preferred embodiment of the present disclosure. The horizontal axis represents time, and the vertical axis represents monitor signals Trig_M and Trig_S1 having digital signal characteristics and when they are triggered. In the embodiment of the present invention, a seismometer (sensor) is used to detect seismic longitudinal waves or vibration signals, so as to trigger the monitor signals. The monitor signals in the embodiment of the present invention can be triggered by positive triggering or negative triggering, but are not limited herein.

In the full text of the present invention, positive triggering means a signal transition from a low state to a high state, negative triggering means a signal transition from a high state to a low state. In addition, an enabled signal means a signal is in a high/low state, and a disable signal means a signal is in a low/high state.

It should be noted that the detection sites of the seismographs or sensors matched in the embodiment of the present invention are configured at different locations in the same area, and when an earthquake occurs, the longitudinal waves that appear first pass through these detection sites where these seismographs or sensors are located, each seismograph or sensor will be triggered successively, and then the monitor signal will be triggered successively. According to an aspect of the embodiment of the present invention, it is possible to determine whether an earthquake occurs by observing whether the monitor signals exist or not, and comparing the timeliness between the monitor signals. As shown in FIG. 1A, it compares the triggering and the receiving of the first signal Trig_M with the second signal Trig_S1. Since both the first signal Trig_M and the second signal Trig_S1 detected represent as a triggered state at an intersection time point TGM (i.e., the first signal Trig_M and the second signal Trig_S1 are both enabled at the intersection time point TGM), it can be determined that a potential earthquake/seismic event exists. In addition, as shown in FIG. 1B, since both the first signal Trig_M and the second signal Trig_S1 detected represent as a triggered state at the intersection time point TGM (i.e., the first signal Trig_M and the second signal Trig_S1 are both enabled at the intersection time point TGM), it can also be determined that a potential earthquake/seismic event exits.

The embodiment in FIG. 1A is an example in which the timeliness judgment signal Trig_C is triggered, and the embodiment in FIG. 1B is an example in which the timeliness judgment signal Trig_C is not triggered. In FIG. 1A, it shows that when the intersection time point TGM occurs and an interval between a first triggered time point Trig_M and a second triggered time point Trig_S1 is within a specific period DT1, a timeliness judgment signal Trig_C is triggered. That is, the timeliness judgment signal Trig_C is triggered at the trigger time point TGC, and it is determined that the first vibration state is a real earthquake/seismic event accordingly. That is, it can be determined that the potential seismic event is the real seismic event.

One of the purposes of setting the specific period DT1 is to avoid a condition as possible that the first signal Trig_M of the main detection site and the second signal Trig_S1 of the backup detection site both triggered are actually non-seismic events, but are determined as an earthquake event by the system, which is a false alarm condition. For example, the main detection site and the backup detection site are both abnormal triggered due to unpredictable local environmental vibration factors, or abnormal triggering conditions caused by the failure of the sensors at the backup detection sites, etc. For example, as shown in FIG. 1B, the interval between the time point TGM triggered by the first signal Trig_M and the time point TGS1 triggered by the second signal Trig_S1 is not within the specific period DT1, so the timeliness judgment signal Trig_C is not triggered, i.e. Trig_C is not triggered. Then it can be determined that the potential seismic event is a non-seismic event.

In any embodiment of the present invention, the real-time detection of the number of triggers of the monitor signal can be based on a majority rule to determine whether there is a potential earthquake event, and then enter the time difference determination. If there are a total of two monitor signals including the main detection location and the backup detection location, it can be reasonably set that the monitor signals of the main detection location and the backup detection location must be detected in a triggered state (in accordance with the majority decision, if the number of monitor signals triggered is equal to the number of monitor signals that are not triggered, the rule of majority vote is not met), and then the judgment step of the time difference is entered. According to an embodiment, if there is no signal triggered at the local end of the main detection site, it can be determined as a non-earthquake event regardless of whether the majority rule is met. If a signal is triggered at the local end of the main detection location, but the triggered signal changes to a non-triggered state within the specified period, it can also be determined as a non-earthquake event.

In any embodiment of the present invention, if the first signal Trig_M is not triggered, it is determined as a non-earthquake event. If the first signal Trig_M is triggered, but does not exceed a predetermined period (for example, DT1), it means that the sustaining time of the vibration wave is not enough. Although the seismic event can be judged according to the data, the data with less than the predetermined period cannot be calculated. Therefore, it is also determined to be a non-seismic event.

Generally speaking, when an earthquake occurs, it usually occurs in a relatively large area, for example, more than ten kilometers, rather than only in the area of several buildings. Specifically, it depends on the earthquake. For example, the wave speed of longitudinal wave is about 6~8 km/sec. Therefore, if the main detection site and the backup detection site are respectively set within a distance of 1 km, the time difference between the longitudinal wave reaching the main detection site and the backup detection site will not exceeds 0.2 seconds. Therefore, it is practical and reliable to set the specific period in the range of, for example, 3 to 6 seconds as a judgment time for determining an earthquake event. In addition, the embodiments of the present invention do not need to estimate the distance between the source and the detection site first, do not need to consider the transmission velocity/speed of the longitudinal wave in different geological characteristics, and do not need to detect the occurrence time of multiple events of the longitudinal wave. On the contrary, by comparing the longitudinal waves detected by the detection site and multiple backup detection sites within a short and simultaneously accurate and effective judgment time, such as the time differences between the detected longitudinal waves, the judgment time is shortened accordingly.

The embodiment in FIGS. 1A and 1B are a relatively simple example of the detection of earthquake signals, which uses a main detection location and a backup detection location in different locations, and the time difference between different seismic longitudinal waves detected at the main detection site and the backup detection site to increase the reliability of earthquake judgment. The first signal Trig_M comes from the main detection site, and the second signal Trig_S1 comes from the backup detection site. However, if there are multiple backup detection locations, it can be further improved and more effective in judging earthquake events or non-earthquake events. The method of adding multiple backup detection locations can be suitable for rapid detection and improve the accuracy and reliability of earthquake early warning, for example, general schools, general residences, corporate offices, etc. Under the economic considerations, the earthquake detection system and earthquake detection device using this method are relatively simple, fast, and effective, and can also save deployment costs.

In a plurality of backup detection locations, when the first signal Trig_M of the main detection location is triggered, a majority decision method may be used to determine whether a potential earthquake event occurs. For example, in an embodiment with only three detection locations including the main detection location, it is determined whether the first, second, and third signals Trig_M, Trig_S1, and Trig_S2 have an intersection time point (i.e., they are all enabled signals, each of which has an initial enabled time point respectively as a trigger time point), and if there is an intersection time point, determine how many signals are in triggered state (i.e., how many signals are enabled at the intersection) during the intersection duration. When the number of signals triggered during the intersection duration is more than half of the total number of monitor signals (equivalent to at least one trigger of the second/third signals Trig_S1/Trig_S2), it can be determined as a potential seismic event. The second/third signals Trig_S1/Trig_S2 may come from different backup detection locations respectively.

In an embodiment of the present invention, the main detection site and a group of backup detection sites are respectively arranged at different detection locations in the same area for a period of time, and a plurality of monitor signals Trig_M, Trig_S1 and Trig_S2 can be firstly counted during this period according to the historical data during this period to determine whether errors or false alarms occur frequently. For example, multiple monitor signals Trig_M, Trig_S1, Trig_S2 are often intersected, and judged as a potential earthquake event, which may be due to environmental vibration if the noise detected by the seismographs in the main/backup detection sites is too much, then it is easy to cause misjudgment, and the condition of the majority decision can be adjusted adaptively to a full decision, so as to avoid the occurrence of misjudgment by stricter conditions. On the contrary, in areas where the environment is relatively quiet and there is less human-induced vibration, the decision is made by a fixed number of decisions, rather than a majority decision.

In any embodiment of the present invention, when a time interval of an intersection trigger time point of the second signal Trig_S1 and the third signal Trig_S2 (for example, the intersection trigger time point TGS1S2 in FIG. 5) and the trigger time point TGM of the first signal Trig_M when the distance between the triggering time points TGM of Trig_M is within the specific duration DT1, a timeliness judgment signal Trig_C can be triggered to determine that the first vibration state corresponding to the first signal Trig_M is a real earthquake event, otherwise it is a non-seismic event.

In any embodiment of the present invention, for example, the specific duration DT1 in FIGS. 1A and 1B can be adjusted to DT1' according to the situation. In this case, the second signal Trig_S1 in FIG. 1A triggers the time point TGS1 or the time point TGM triggered by the first signal Trig_M in FIG. 1B is not necessarily the starting point of the specific duration DT1, and the time length can also be adjusted. Other appropriate adjustments can also be made to DT1 and DT1' during the specific duration, so that earthquake events can be quickly determined.

Figure 2:
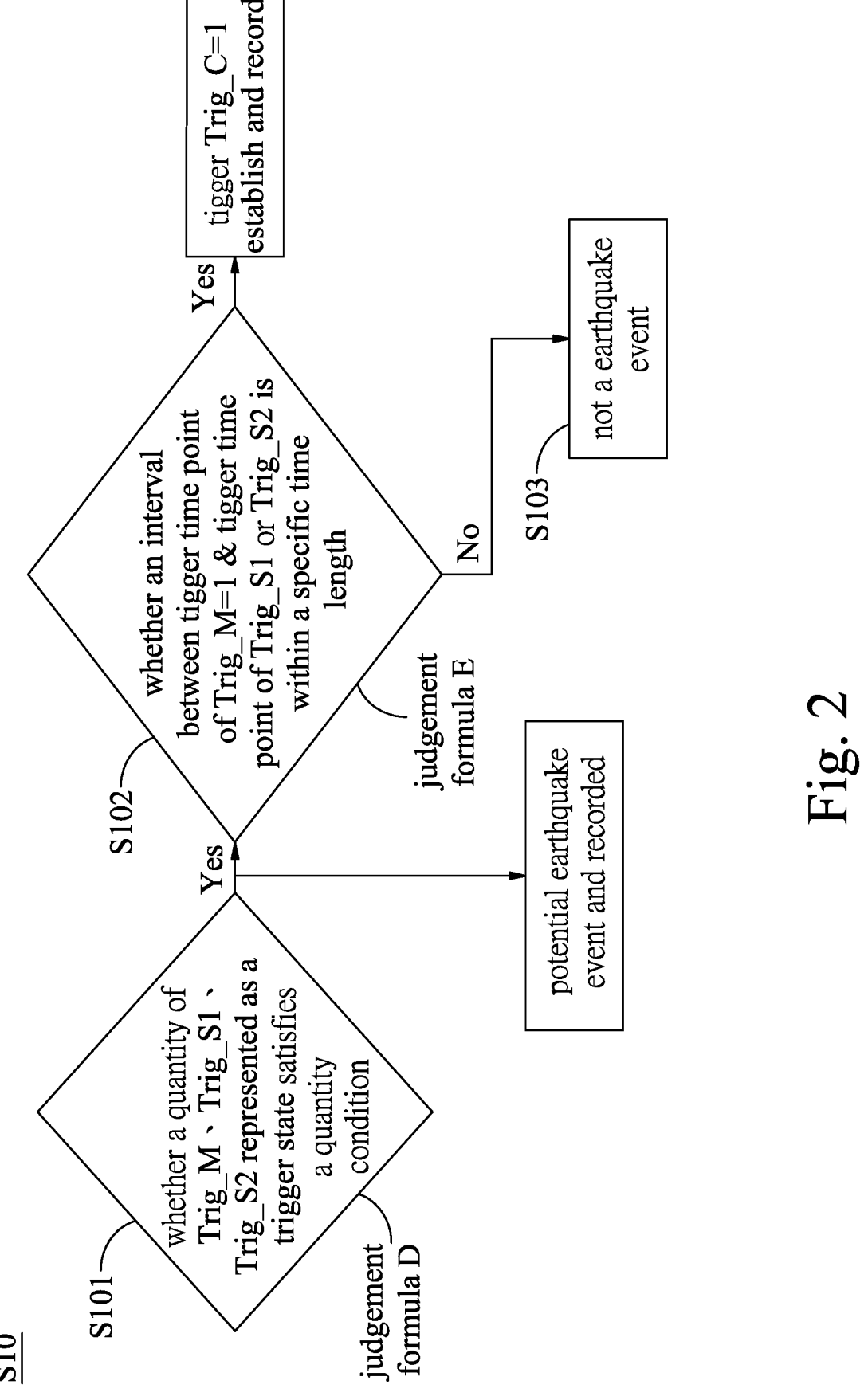
FIG. 2 is a schematic diagram showing the flow of the earthquake detection method according to a preferred embodiment of the present invention.

Please refer to FIG. 2, which is a schematic diagram of the flow of the earthquake detection method S10 according to the preferred embodiment of the present invention. The earthquake detection method S10 mainly includes a trigger number judgment step S101 and a time judgment step S102, and the judgment method is as follows. Step S101 (judgment rule 1) includes determining whether a quantity in Trig_S1 and Trig_S2 represented as a trigger state satisfies a quantity condition and whether Trig_M and Trig_S1 or Trig_S2 satisfying the quantity condition are simultaneously represented as a trigger state (i.e. a quantity that both signals Trig_S1 and Trig_S2 are enabled) at an intersection time point (judgment formula D); if yes, it can be determined that the potential seismic event is established and recorded. Then go to Step S102. Step S102 (judgment rule 2) includes determining whether the intersection point occurs and an interval between a first trigger time point of the first signal and a second trigger time point of Trig_S1 or Trig_S2 satisfying the quantity condition is within a specific time length DT1 (i.e. the first and second initial enabled time points TGM, TGS1 is within a specific time length DT1) (judgement formula E); if yes, then trigger the timeliness judgment signal Trig_C, and determine that the first vibration state corresponding to the first signal Trig_M is a real seismic event (or a potential seismic event is a real seismic event); otherwise, go to Step S103 to determine that it is a non-seismic event.

Please refer to FIG. 3, which is a schematic diagram of the earthquake detection method S20 for judging an earthquake by the time sequence intersection of multiple seismographs according to a preferred embodiment of the present invention, which can be summarized as follows. Step S201 includes triggering a first signal Trig_M and a second signal Trig_S1 respectively in response to a first vibration state of a main detection site and a second vibration state of a first backup detection site. Step S202 includes receiving the first signal Trig_M and the second signal Trig_S1. Step S203 (judgement rule 1) includes determining whether the first signal Trig_M and the second signal Trig_S1 are both represented as trigger state at an intersection time point (i.e. the first signal and the second signal are both enabled at a specific time point). Step S204 (judgment rule 2) includes triggering a timeliness judgment signal Trig_C when an interval between the first trigger time point TGM (i.e., the first initial enabled time point) and the second trigger time point TGS1 (i.e., the second initial enabled time point) is within a specific time length DT1, so as to determine the first vibration state is a real earthquake event.

In any embodiment of the present invention, when the first signal Trig_M is not triggered, it is determined as a non-earthquake event.

Figure 4:
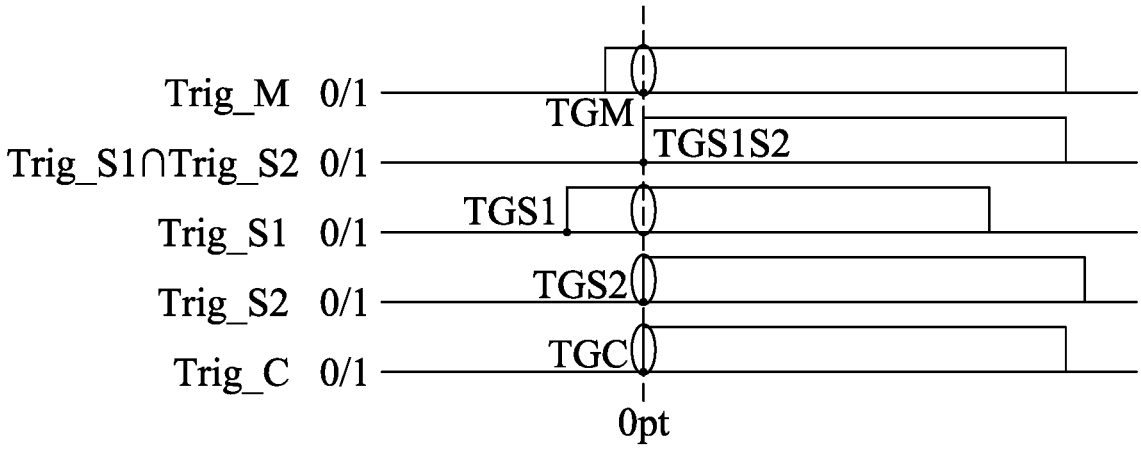
FIG. 4 is a schematic diagram showing digital waveforms of the monitor signals and the timeliness judgment signal according to a preferred embodiment of the present disclosure.
Figure 5:
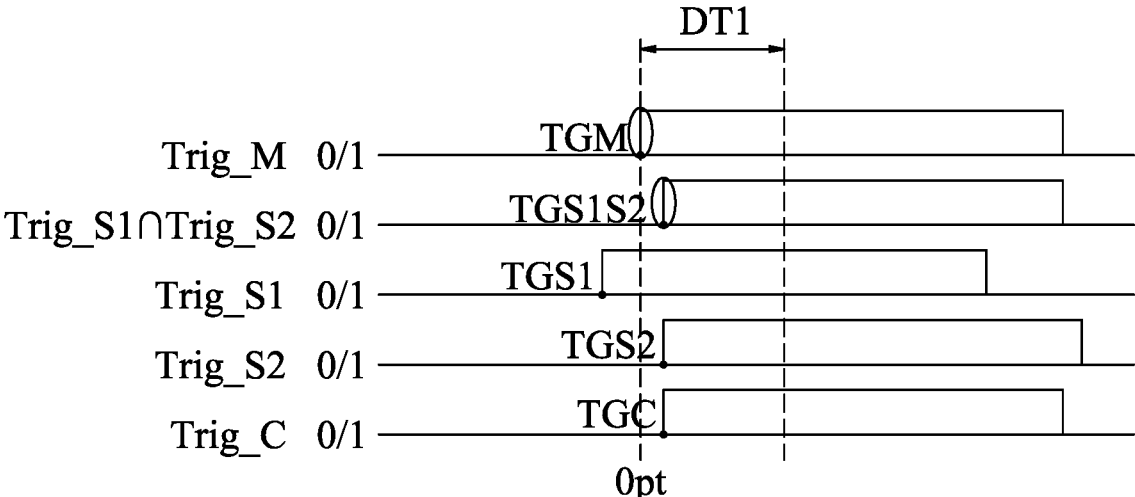
FIG. 5 is a schematic diagram showing digital waveforms associated with the judgment formulas D and E according to a preferred embodiment of the present disclosure.

Please refer to FIGS. 4 and 5, which are schematic diagrams of the digital waveforms of the monitor signals Trig_M, Trig_S1, Trig_S2, and the timeliness judgment signal Trig_C according to the preferred embodiment of the present invention. The horizontal axis represents time, and the vertical axis represents the monitor signals Trig_M, Trig_S1, Trig_S2 of the digital signal characteristics, and when the timeliness judgment signal Trig_C is triggered. TGM, TGS1, TGS2, and TGC represent the trigger time points of the monitor signals Trig_M, Trig_S1, Trig_S2, and the timeliness judgment signal Trig_C respectively. TGS1S2 represents the trigger time point (i.e., the initial time point when the monitor signals Trig_S1, Trig_S2 are both enabled) of the intersection Trig_S1∩Trig_S2 of the monitor signals Trig_S1 and Trig_S2 at the backup detection location. This embodiment can cover not only the case of receiving the monitor signals Trig_S1 and Trig_S2 of two backup detection locations, but it is assumed that at least Trig_S1 and Trig_S2 are in the trigger state (i.e., the monitor signals Trig_S1, Trig_S2 are both enabled) to establish a potential seismic event, that is, a number condition is equal to 2 or greater than equal to 2. In another embodiment, if there are other N backup signals from the backup detection location, the condition of the quantity ratio of the monitor signals Trig_S1, Trig_S2 and the other N−2 backup signals can be set to be equal to 2/N or greater than is equal to 2/N.

In FIG. 4, all the first, second, and third signals Trig_M, Trig_S1, and Trig_S2 are monitored in real time. When the second signal (the first backup signal) Trig_S1 is detected to be triggered at the trigger time point TGS1, the number of triggers is only 1, and it is determined that the number condition (equal to 2 or greater than or equal to 2) is not met. When it is detected in real time that the first signal Trig_M is triggered at the trigger time point TGM, the total number of triggers of Trig_S1 and Trig_S2 is still 1, and it is determined that the number condition is not met. When it is detected in real time that the third signal (second backup signal) Trig_S2 is triggered at the trigger time point TGS2, the total number of triggers of Trig_S1 and Trig_S2 is 2, and it is determined that the number condition is satisfied, so it is determined to be the potential seismic event. In the above-mentioned embodiment, it can be referred to the judgment formula D of step S101 in FIG. 2, or steps S201 to S203 in FIG. 3.

In one embodiment, if the number of backup signal triggers is already satisfied with the quantity condition, even if a new backup signal may be triggered, trigger status of monitoring other backup signals can be temporarily stopped (take the number condition equal to 2 as an example, when the signal Trig_S2 is triggered, the total number of backup signals triggered is 2, which can satisfy the number condition, so the system can temporarily stop monitoring the trigger status of other backup signals). In another embodiment, the trigger status of the backup signal can also be continuously monitored (taking the quantity condition greater than or equal to 2 as an example, when the signal Trig_S2 is triggered, the total number of backup signals triggered is 2, although the quantity condition is satisfied, but the trigger status of other backup signals can still be monitored continuously. If a new backup signal is triggered, the number of backup signals triggered shall be greater than 2).

Please refer to FIG. 5, which is a schematic diagram of the digital waveforms associated with the judgment formulas D and E according to the preferred embodiment of the present invention. In FIG. 5, after monitoring that the first signal Trig_M and the intersection signal Trig_S1∩Trig_S2 (or third signal Trig_S2) of the second signal and the third signal Trig_S2 (or the third signal Trig_S2) at an intersection time point TGS1S2 (or TGS2) are all represented to be triggered, it can be determined as a potential seismic event, and then the time judgment factor is added. If the interval between the trigger time point of Trig_M and the trigger time point TGS1S2 of Trig_S1∩Trig_S2 (or the trigger time point TGS2 of Trig_S2) is within the specific duration DT1, the timeliness judgment signal Trig_C is triggered at the intersection time point TGS1S2 (or TGS2) to determine that the first vibration state corresponding to the first signal Trig_M is a real earthquake event. In the above-mentioned embodiment, it can be referred to the judgment formula D of Step S101 in FIG. 2, and the judgment formula E of Step S102, or the steps S201 to S204 in FIG. 3.

Figure 6:
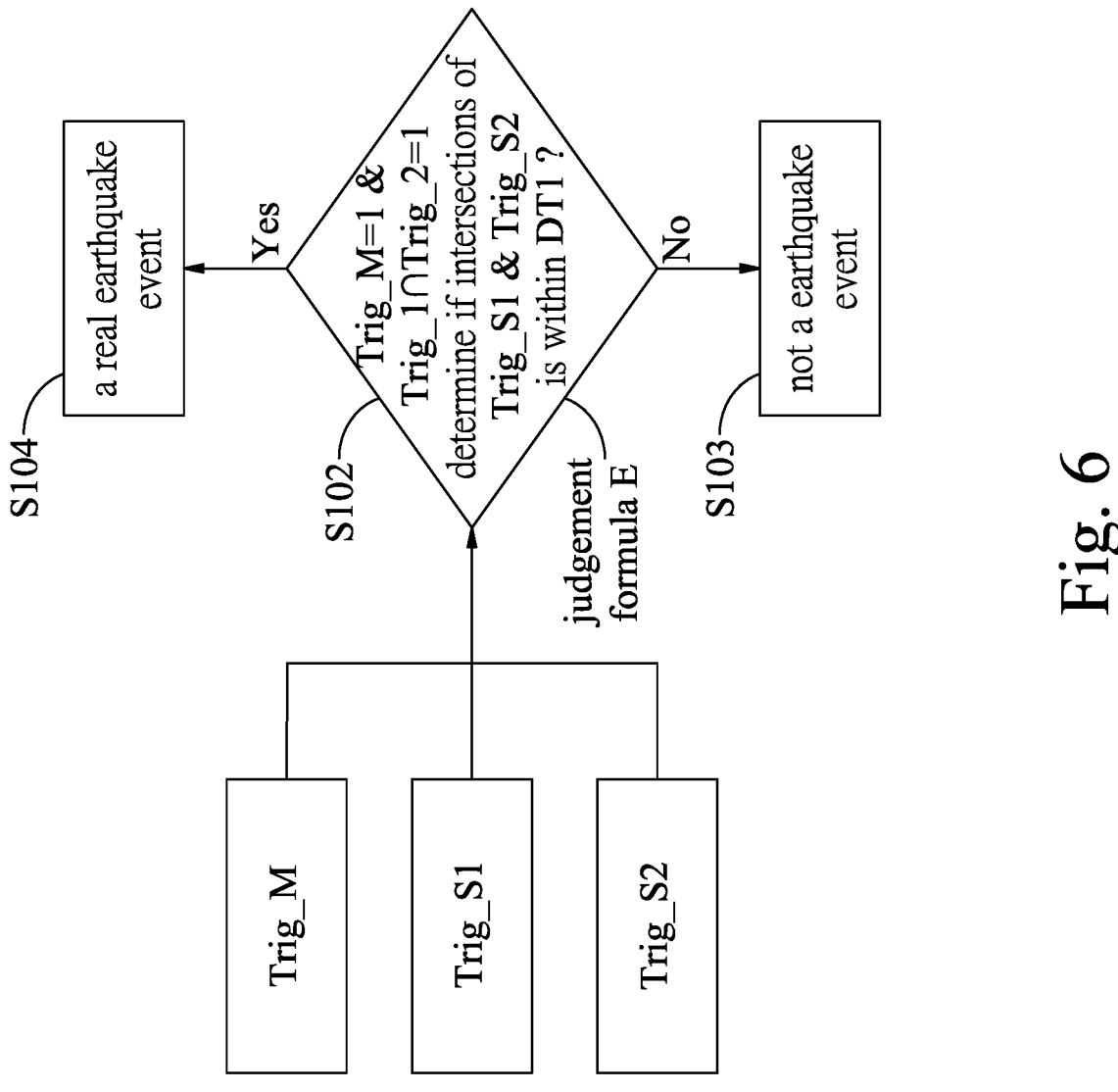
FIG. 6 is a schematic diagram showing a more detailed process of the formula E according to a preferred embodiment of the present invention.

Please refer to FIG. 6, which is a schematic diagram of a more detailed process of the formula E according to another embodiment of the present invention. Please refer to FIGS. 2 and 6 together. Step S102 includes determining whether an interval between a first trigger time point TGM of the first signal Trig_M and a second trigger time point TGS1S2 of the intersection signal Trig_S1(first backup signal) ∩Trig_S2(second backup signal) is within a specific duration; if yes, go to Step S104 to determine a real seismic event; if no, go to Step S103 to determine a non-seismic event. If the first signal Trig_M is not triggered or the interval between the triggering time points of Trig_M and Trig_S1∩Trig_S2 is not within the specific duration DT1, then go to Step S103 to determine that it is a non-seismic event.

Figure 7:
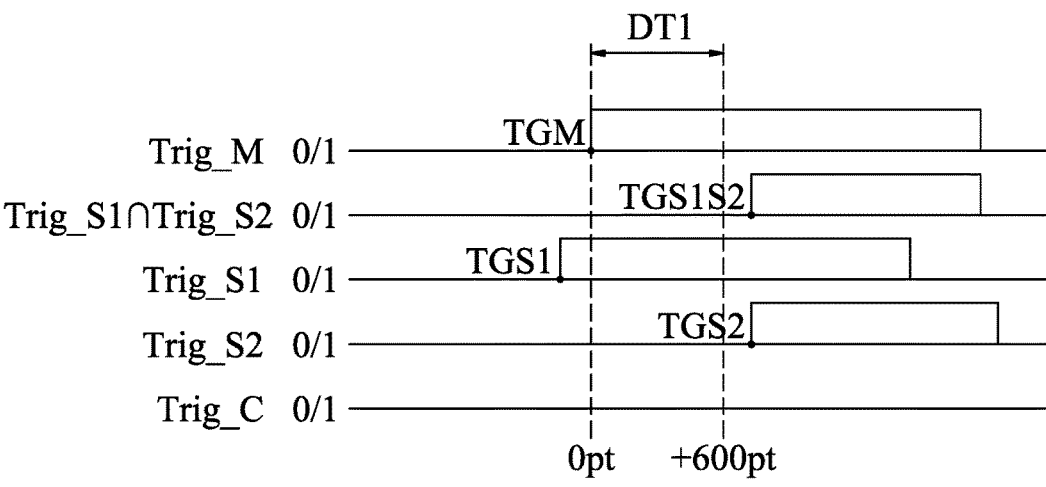
FIG. 7 is a schematic diagram showing digital waveforms determined as non-seismic events according to a preferred embodiment of the present disclosure.

Please refer to FIGS. 7, 8, 9, 10, and 11, which are schematic diagrams of digital waveforms determined as non-seismic events according to a preferred embodiment of the present invention. These embodiments can cover not only the case of receiving the monitor signals Trig_S1 and Trig_S2 of the two backup detection locations, but if at least Trig_S1 and Trig_S2 are in the trigger state (i.e., Trig_S1 and Trig_S2 are enabled), it will continue to determine whether it is a real earthquake event; that is, a quantity condition is 2 or greater than or equal to 2. In FIG. 7, all the first, second, and third signals Trig_M, Trig_S1, and Trig_S2 are monitored in real time. When the second signal Trig_S1 is detected to be triggered at the trigger time point TGS1, the number of Trig_S1 and Trig_S2 triggered is only 1, it is determined that the quantity condition is not met (equal to 2 or greater than or equal to 2). When it is detected in real time that the first signal Trig_M is triggered at the trigger time point TGM, the total number of triggers of Trig_S1 and Trig_S2 is still 1, and it is determined that the number condition is not met. When it is detected in real time that the third signal Trig_S2 is triggered at the trigger time point TGS2, the total number of triggers of Trig_S1 and Trig_S2 is 2, and it is determined that the number condition is satisfied, so it can be determined as the potential earthquake event. Then the time judgment factor is added, because the interval between the trigger time point TGM of the first signal Trig_M and the trigger time point TGS1S2 of the intersection signal of the second signal Trig_S1 and the third signal Trig_S2 is not within the specific duration DT1, the condition of the judgment formula E is not satisfied, so it is determined as a non-seismic event.

Figure 8:
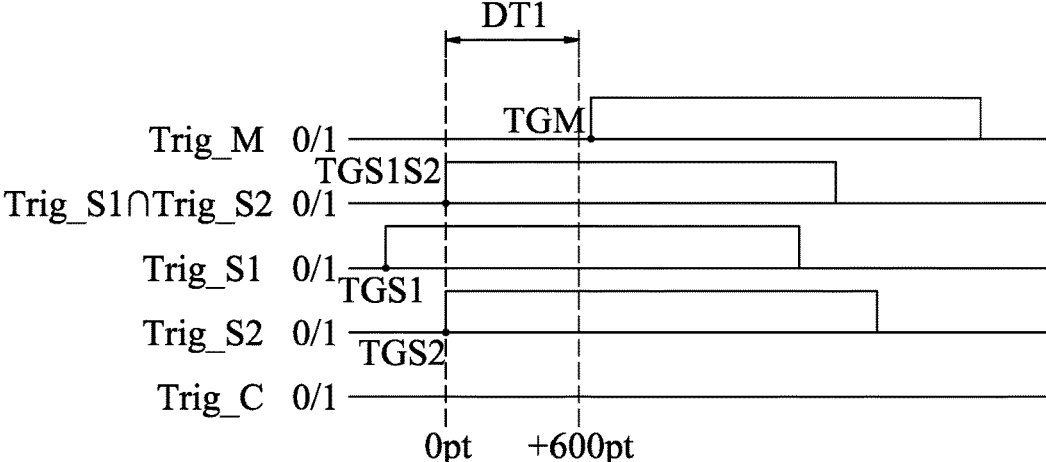
FIG. 8 is a schematic diagram showing digital waveforms determined as non-seismic events according to another preferred embodiment of the present disclosure.

In FIG. 8, all the first, second, and third signals Trig_M, Trig_S1, and Trig_S2 are monitored in real time. When the first signal Trg_M is detected to be triggered at the trigger time point TGM, both Trig_S1 and Trig_S2 are represented as trigger state, i.e., both are enabled. Therefore, the total number of triggers of Trig_S1 and Trig_S2 is 2, and it is determined that the number of conditions is satisfied, so it can be determined as the potential seismic event. Then the time judgment factor is added, because the interval between the trigger time point TGM of the first signal Trig_M and the trigger time point TGS1S2 of the intersection signal of the second signal Trig_S1 and the third signal Trig_S2 is not within the specific duration DT1, the condition of the judgment formula E is not met, so it is determined as a non-seismic event.

Figure 9:
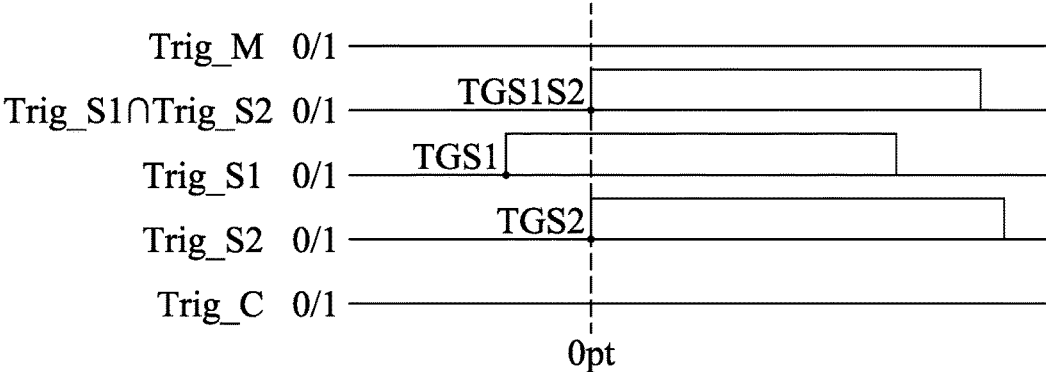
FIG. 9 is a schematic diagram showing digital waveforms determined as non-seismic events according to another preferred embodiment of the present invention.

In FIG. 9, all the first, second, and third signals Trig_M, Trig_S1, and Trig_S2 are monitored in real time. When the second signal Trg_S1 is detected to be triggered at the trigger time point TGS1, the number of triggers is only 1, so it is determined that the quantity condition is not met. When it is detected in real time that the third signal Trig_S2 is triggered at the triggering time point TGS2, the total number of triggers is 2, but the first signal Trig_M is never triggered, so it is not satisfied with the judgement formula D, and therefore is determined as a non-seismic event.

Figure 10:
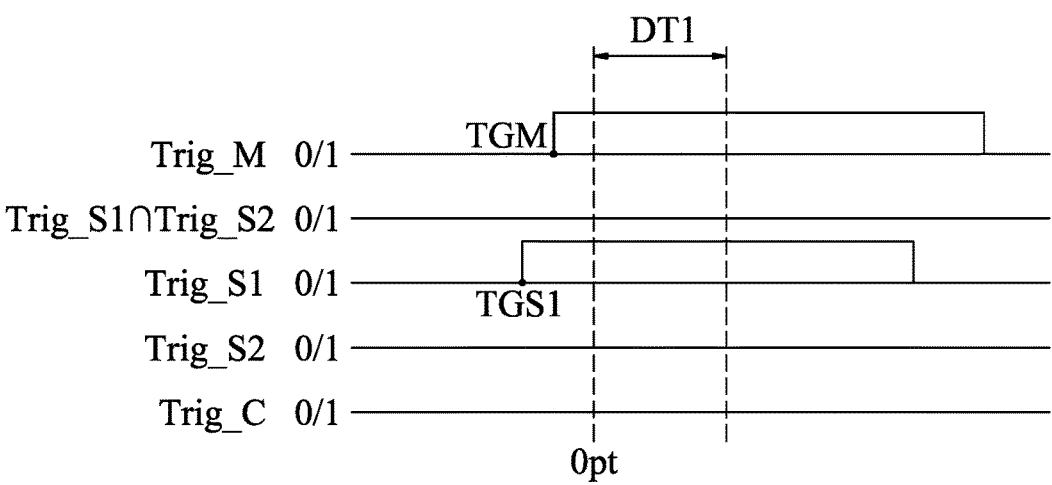
FIG. 10 is a schematic diagram showing digital waveforms determined as non-seismic events according to another preferred embodiment of the present invention.

In FIG. 10, although the number of triggers Trig_S1 and Trig_S2 at the trigger time point TGM is 1, the third signals Trig_S2 associated with one of the backup detection location has never been triggered, it is determined that the number of triggers does not satisfy the quantity condition, which does not satisfy the condition of the judgment formula D, so it is determined as a non-seismic event. However, if the quantity condition in the embodiment of FIG. 10 is set to be equal to 1 or greater than 1, it may be the potential seismic event. If the time judgment factor is added, since the interval between the triggering time point TGM of the first signal Trig_M and the triggering time point TGS1 of the second signal Trig_S1 is within the specific duration DT1, the condition of the judgment formula E can be satisfied, so it can be determined as a real earthquake event.

Figure 11:
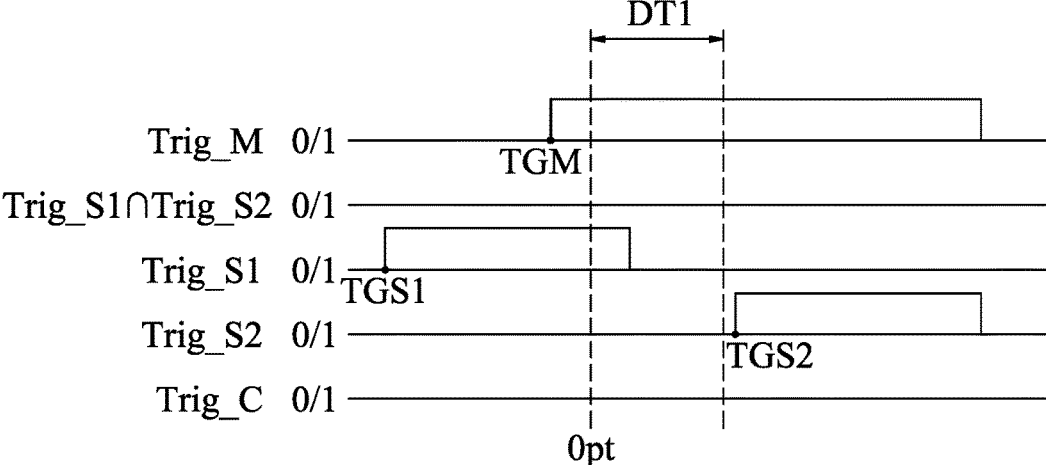
FIG. 11 is a schematic diagram showing digital waveforms determined as non-seismic events according to another preferred embodiment of the present invention.

In FIG. 11, at the trigger time point TGM or TGS2, the number of triggers of Trig_S1 and Trig_S2 is only 1, it is determined that the quantity condition is not met, so it is determined that it is a non-seismic event.

Figure 12:
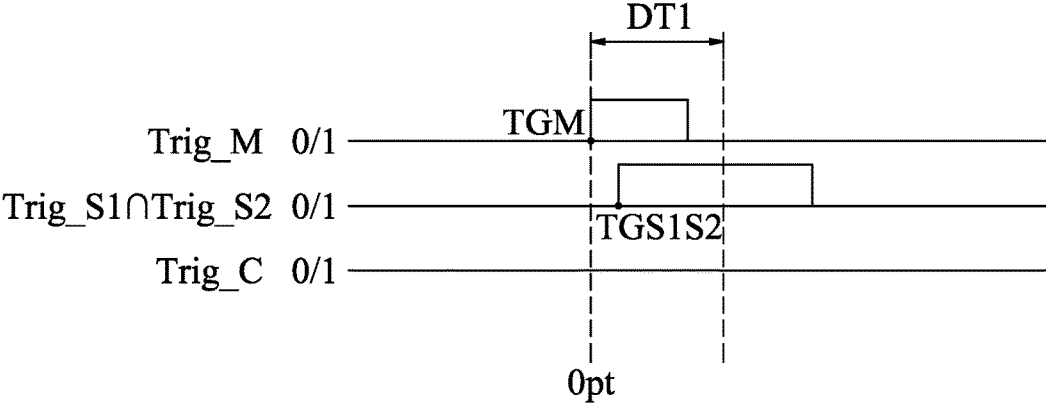
FIG. 12 is a schematic diagram of a waveform determined to be a non-seismic event according another preferred embodiment of the present invention.

Please refer to FIG. 12, which is a schematic diagram of a waveform determined to be a non-seismic event according another preferred embodiment of the present invention. Although an interval between the trigger time point TGM of the first signal Trig_M and the trigger time point TGS1S2 of the intersection signal of the second signal Trig_S1 and the third signal Trig_S2 is within the specific duration DT1, the first signal Trig_M is not in the triggered state (i.e., not enabled) for all the duration of DT1. Even if the time point TGS1S2 triggered by the intersection signal of the second signal Trig_S1 and the third signal Trig_S2 is within the specific duration, it can still be determined as a non-earthquake event.

In any embodiment of the present invention, when an interval between the trigger time point TGM of the first signal Trig_M and the trigger time point TGS1S2 of the intersection signal of the second signal Trig_S1 and the third signal Trig_S2 is within the specific duration DT1, a timeliness signal Trig_C can be triggered, so as to determine that the first vibration state corresponding to the first signal Trig_M is the real earthquake event; otherwise it is the non-seismic event.

Please refer to FIG. 13, which is a schematic diagram of the earthquake detection method S50 according to another preferred embodiment of the present invention. The method S50 comprises the following steps. Step S501 includes triggering a first signal and at least a second signal respectively in response to a first vibration state of a main detection site and at least a second vibration state of at least a backup detection site. Step S502 includes receiving the first signal and the at least a second signal. Step S503 (judgement rule 1) includes determining whether a quantity represented as a trigger in the at least a second signal satisfies a quantity ratio condition and whether the first signal and the second signal satisfying the quantity ratio condition are at an intersection time point and are presented as a trigger state (i.e. the first and the second signal are both enabled at the intersection time point). Step S504 (judgment rule 2) includes triggering a timeliness judgment signal when the intersection time point occurs and an interval between a first trigger time point of the first signal and a second trigger time point of the second signal satisfying the quantity ratio condition is within a specific time length, so as to continue determining that the first vibration state is a real earthquake event.

In any preferred embodiment of the present invention, when the first vibration state is a real seismic event, the first vibration state can be determined to be from a seismic longitudinal wave. Wherein, in the at least a second signal, a first number is represented as a triggered state number (i.e., enabled number) and a second number is represented as a non-triggered state number (i.e., disenabled number), and the number ratio condition is that the first number is greater than or equal to the second number.

In any preferred embodiment of the present invention, the second signal that satisfies the quantity ratio condition is the one that exactly satisfies the quantity ratio condition (taking for example in FIG. 4, N backup detection locations and the quantity ratio condition is 2/N, for example, the second signal can be Trig_S1 and Trig_S2) or the second signal that was last triggered before the intersection time point (take FIG. 8 as an example, N backup detection locations, and the number ratio condition is greater than or equal to 2/N, the second signal can be Trig_S1 and Trig_S2. If there are other backup signals triggered between TGS2 and TGM, the second signal satisfying the quantity ratio condition will also include other backup signals of the trigger).

Please refer to FIG. 14, which is a schematic diagram of the earthquake detection method S60 according to another preferred embodiment of the present invention. The method S60 includes the following steps. Step S601 includes triggering a first signal Trig_M and at least a second signal Trig_S1, Trig_S2 respectively in response to a first vibration state of a main detection site and at least a second vibration state of at least a backup detection site; Step S602 includes receiving the first signal Trig_M and the at least a second signal Trig_S1 and Trig_S2 from the at least a backup detection location; Step S603 (judgement rule 1) includes determining whether a trigger quantity of the at least a second signal Trig_S1 and Trig_S2 represented as trigger state satisfies a quantity condition (for example, equal to 2 or greater than 2) and whether the first signal Trig_M and the second signal (for example, Trig_S2) satisfying the quantity condition are at an intersection time point (For example, TGS1S2 or TGS2) and are both represented as trigger state (i.e., both are enabled); and Step S604 (judgment rule 2) includes determining whether the first vibration state is a real earthquake event when the intersection time point occurs, and an interval between a first trigger time point TGM of the first signal Trig_S1 and a second trigger time point TGS1, TGS2 of the second signal Trig_S2 satisfying the quantity condition meets a time relationship.

In any preferred embodiment of the present invention, the time relationship is that the interval between a first trigger time point (i.e. first initial enabled time point) of the first signal Trig_M and a second trigger time point (i.e. second initial enabled time point) of the second signal (for example, Trig_S2) satisfying the quantity condition (for example, TGS1S2 or TGS2) is within a specific time length DT1.

In any preferred embodiment of the present invention, the backup detection location includes a first backup detection location and a second backup detection location, and the at least a second signal includes a first backup signal Trig_S1 and a second backup signal Trig_S2 respectively from the first backup detection location and the second backup detection location. The method further includes the following steps: receiving the first backup signal Trig_S1; receiving the second backup signal Trig_S2, wherein the second backup signal Trig_S2 is transmitted through a remote network, wherein: the quantity condition is greater than or equal to 2; at the intersection time point (e.g., TGS1S2 or TGS2), the first backup signal Trig_S2 and the second backup signal Trig_S2 are all represented as the trigger state (i.e. both are enabled); and the time relationship is that the interval between the trigger time point TGM of the first signal Trig_M and the later trigger time point (e.g. TGS2) of the first backup signal Trig_S1 and the second backup signal Trig_S2 is within a specific time length DT1.

Those skilled in the art can understand that the various embodiments of the present invention described above can utilize the electronic information equipments, devices, systems, or architectures, such as servers or computers, with the appropriate software, hardware or firmware for implementation.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. An earthquake detection method, comprising the following steps:

receiving a first signal and at least a second signal, wherein the first signal is triggered in response to a first vibration state of a main detection site, and the at least a second signal is triggered in response to at least a second vibration state of at least a backup detection site;

determining whether a quantity of those being enabled among the at least a second signal satisfies a quantity ratio condition, and determining whether the first signal and the at least a second signal are both enabled at a specific time point, wherein the first signal and the at least a second signal respectively have a first and at least a second initial enabled time points; and determining there is a real earthquake event when an interval between the first and the at least a second signal is within a specific time length, wherein the at least a second signal has a first enabled quantity and a second disabled quantity, and the quantity ratio condition is a condition that the first enabled quantity is larger than or equal to the second disabled quantity.

2. The earthquake detection method as claimed in claim 1, further comprising a step of:

when the interval is within the specific time length, a timeliness judgment signal is triggered.

3. An earthquake detection method, comprising the following steps:

receiving a first signal and at least a second signal, wherein the first signal is triggered in response to a first vibration state of a main detection site, and the at least a second signal is triggered in response to at least a second vibration state of at least a backup detection site;

determining whether a quantity of those being enabled among the at least a second signal satisfies a quantity condition, and determining whether the first signal and the at least a second signal are both enabled at a specific time point, wherein the first signal and the at least a second signal respectively have a first and at least a second initial enabled time points; and determining there is a real earthquake event when an interval between the first and the at least a second signal satisfies a time relationship, wherein the time relationship is that the interval between the first initial enabled time point and the at least a second initial enabled time point is within a specific time length; and wherein the at least a second signal has a first enabled quantity and a second disabled quantity, and the quantity condition is a condition that the first enabled quantity is larger than or equal to the second disabled quantity.

4. The earthquake detection method as claimed in claim 3, further comprising a step of providing an enabled signal and a timeliness judgment signal, wherein:

when the quantity satisfies the quantity condition, the enabled signal is triggered;

the enabled signal has a third initial enabled time point; and when an interval between the first initial enabled time point and the third initial time point is within the specific time length, the timeliness judgment signal is triggered.

5. An equipment, device, system, or architecture using the earthquake detection method of claim 3.

* * * * *